United States Patent [19]

Inoue et al.

[11] Patent Number: 4,590,493
[45] Date of Patent: May 20, 1986

[54] OPTICAL DISC

[75] Inventors: Takao Inoue, Hirakata; Munehiro Yoshimura, Moriguchi, both of Japan

[73] Assignee: Matsushita Electric Industrial Co., Ltd., Osaka, Japan

[21] Appl. No.: 626,838
[22] PCT Filed: Oct. 25, 1983
[86] PCT No.: PCT/JP83/00377
§ 371 Date: Jun. 26, 1984
§ 102(e) Date: Jun. 26, 1984
[87] PCT Pub. No.: WO84/01848
PCT Pub. Date: May 10, 1984

[30] Foreign Application Priority Data

Oct. 26, 1982 [JP] Japan .................. 57-188523

[51] Int. Cl.⁴ .................. G01D 15/34; G11B 7/24; G03C 5/04
[52] U.S. Cl. .................. 346/135.1; 369/283; 369/284; 427/162; 427/402; 428/913; 430/495; 430/945; 430/961
[58] Field of Search .................. 346/135.1; 427/162, 427/400, 402; 428/913; 430/495, 945, 961; 369/283, 284

[56] References Cited

U.S. PATENT DOCUMENTS 4,340,655  7/1982  Hollister et al. ............ 430/14 X
4,360,820 11/1982  Forster et al. ............ 346/135.1
4,458,004  7/1984  Tanikawa ............ 430/270 X Primary Examiner—E. A. Goldberg
Assistant Examiner—Gerald E. Preston
Attorney, Agent, or Firm—Wenderoth, Lind & Ponack

[57] ABSTRACT

The present invention provides an optical disc comprising a resin disc (1), a metal film (2) formed on at least one surface of the resin disc (1), a protective film (3) highly adhesive to the metal formed on the resin disc (2), and a hard coating film (4) formed on the resin disc (1) and the protective film (3) and having a bridging density higher than that of the aforementioned protective film (3) and such a high surface hardness that it is not vulnerable even when the optical disc is roughly handled; the protective film (3) on the metal film (2) has the three effects of protecting the metal film (2), improving the corrosion prevention and, further, improving the cohesion to the hard coating film (4).

3 Claims, 3 Drawing Figures

OPTICAL DISC

TECHNICAL FIELD

The present invention relates to an optical disc comprising a resin disc, as its substrate, with a metal film on the surface of, e.g. optical reproduction discs which utilizes laser or other light sources.

Such a disc has a protective coating on the metal film. The present invention provides an optical disc having on the metal film two layers of film—a protective film which is highly cohesive to the metal and a hard coating—and a hard coating on the opposite surface of the resin disc, which is improved with respect to susceptibility to warpage or injury and which features ease of handling.

BAKCGROUND ART

The optical disc generally represented by a digital audio disc is being manufactured by forming by way of sputtering or vapor-deposition a film of aluminum, etc., on the signal side surface of an acrylic resin disc or polycarbonate resin disc into which signals have been written by injection molding or photo polymerization. Because such a disc is susceptible to injury, the provision a protective film for the metal film and the provision a protective material for the resin surface have been desired; however, no particular structure, for such a film has been devised.

Thus in order to have excellent adhesion the metal film, normally, acrylate monomers having phosphate radicals and with small molecular weights are added or primers are mixed. Such a method, however, has raised the problem of increasing the acidity (pH) of the coating material or causing electrolysis of aluminum film. However, for the improved adhesion on metal attained by phosphate radical, acrylates of novel molecular structure were desired. Because the audio disc utilizes laser beams, without using a needle, the disc and the optical pick-up do not make contact. However, since dust adhering on the disc disperses the beams, the cleaning of its surface e.g. by wiping it with a cloth is necessary, but may cause injury. Such injury, if large, would scatter the laser beams, thus interfering with inputting of signals.

The present inventors have noted that when coating urethane coating material or acrylate material, if the protective film is too thick, a disc with smooth surface cannot be obtained or, if the protective film is hard and thick, warping of substrate occurs, problems of warpage and impairment of surface flatness have been experienced.

Thus it is desired to have an optical disc on which a protective film excellent in cohesion to metal film and a hard coating excellent in cohesion to the protective film and the resin substrate (polycarbonate substrate, in particular) are formed to such thickness that they do not cause development of warpage.

DISCLOSURE OF THE INVENTION

The present invention has achieved an optical disc comprising a resin disc, a metal film formed on at least one of the surfaces of the resin disc, a protective film formed on this metal film and a hard coating formed on the resin disc or on the protective film and having a bridging density which is higher than that of the aforementioned protective film, said optical disc being of a structure such that not only the metal film is protected from scratching, but also corrosion prevention is improved by forming a protective film on the metal film and, further, an adherent hard coating on the protective film. This permits high transmission of laser beams and provides improved protection of the disc of a resin such as polycarbonate, etc., from scratching.

THE MOST PREFERRED MODE OF EXERCISING THE INVENTION

Figure 1:
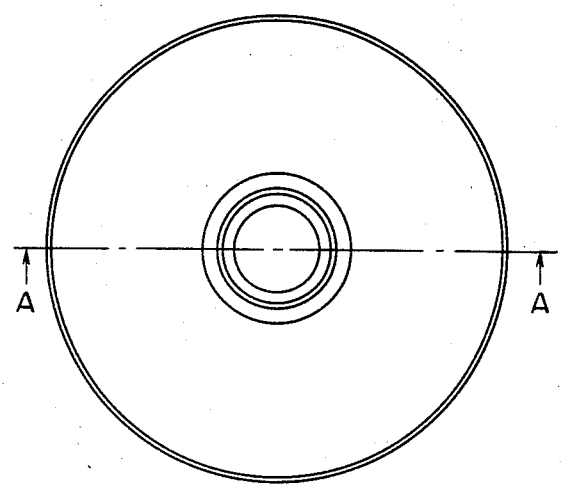
FIG. 1 is a plan view of an optical disc, an embodiment of this invention.
Figure 2:
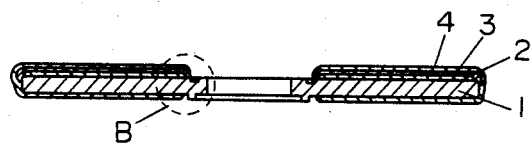
FIG. 2 is a section view on line A—A.
Figure 3:
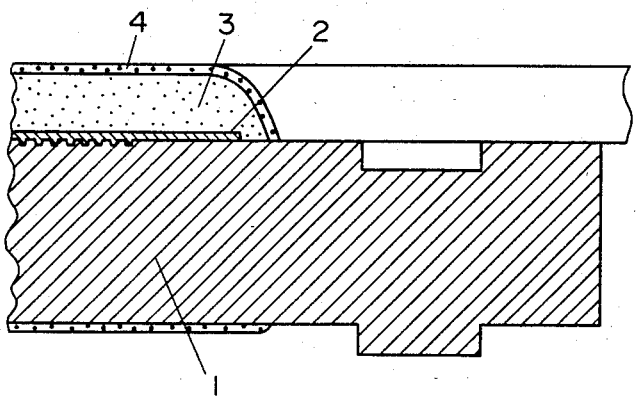
FIG. 3 is an enlarged section view of the part of B shown in FIG. 2.

In the following, an embodiment of this invention is described with reference to the accompanying drawings and experiment result tables. FIG. 1 is a plan view of an optical disc of this invention, which is an extrusion molded polycarbonate substrate with 120 dia. and having a hollow for cassette at the center. FIG. 2 gives a section view on line A—A of FIG. 1. Numeral 1 designates a resin substrate having signal undulations on one surface; 2, a metal film of aluminum of an order of 2,000Å applied by sputtering on the signal undulations; on this film a protective film 3 is formed; and on the surface of this film 3 and on the opposite surface of the substrate, hard coating 4 is formed. It is possible to omit the hard coating on the upper surface. FIG. 3 prevents an enlarged partial sectional view of the part B of FIG. 2.

Used as the hard coating is a hard coating composition which contains 2~30 weight % of epoxypolyacrylate obtained by reaction of bisphenol type epoxy with acrylic acid, 70~98 weight % of at least one of acrylic monomers having 3 or more functional groups—either one of trimehylopropanetriacylate or dipentaerythritolhexacylate—less than 20 weight % of dilutable acrylate monomer having 2 or less functional group, and 1~10 weight % of sensitizer.

Table 1 shows the results of examination of the protective film and the hard coating with regard to their coating performance and their effect on the state of warpage of the polycarbonate substrate. As urethane acrylate, UV-160P manufactured by Mitsubishi Yuka and UL-1002 and UL-5003 manufactured by Mitsubishi Rayon were used and as acrylate monomers, trimethylolpropanetriacrylate (TMPTA) and MANDA manufactured by Nihonkayaku and, further, glycidylmethacrylate (G) were employed. The results indicated that when urethaneacrylate was used singly, its cohesion on aluminum was not high enough. The most preferable mixture of urethane acrylate and acrylate monomer was found to be one having a viscosity at room temperature (25° C.) between 50 cps and 3,000 cps. UV-160P having a phosphate radical in the molecule of urethaneacrylate features excellent cohesiveness to aluminum. The experimental examples of 1-4 and 1-5 revealed that hard coating materials of ultraviolet setting type (Mitsubishi Rayon and Matsushita Electric Industrial Co., Ltd.) could form the most suitable coating film. This is because these hard coating materials contain more acrylyl radicals in their mixed compositions than the protective coating materials and, therefore, the former have a higher bridging density. Table 2 gives experimental examples indicating evaluations based on the cohesiveness, warpage and coating performance of set film, as related to the component ratios of various types of urethaneacrylate and acrylate monomers. This table suggests that the protective coating containing 5~50 weight parts of urethane(meth)acrylate which is set with acrylate monomers and sensitizer is most suitable.

Table 3 gives results of experimental examples in which the effects of the film thickness of the protective coating and that of the hard coating on the coating performance, warpage of substrate and the surface hardness as defined by the hardness of pencil lead were examined. As the protective film, the composition of the experimental example 2-1 was used and as a particular example of the hard coating, a composition of 10 wt. % of bisphenol type epoxy(meth)acrylate, 60 wt. % of acrylate monomer having 3 or more functional groups, 27 wt. % of (meth)acrylate monomer having 2 or less functional groups and 3 wt. % of sensitizer was employed; actually, the hard coating material used was prepared by diluting this composition with isopropyl alcohol at 50:50. The set film thickness should preferably be from 1 m to 20 m; the protective film, from 2 m to 30 m, and more preferably, the protective film thickness should run from 5 μm to 20 μm; and the most suitable film thickness of the hard coating should be 2 μm~10 μm.

TABLE 1

| Experiment No. | Protective coating | Hard coating | Coating performance (visual observation) | Warpage | Evaluation |
|---|---|---|---|---|---|
| 1-1 | Urethane acrylate | — | Coating spotty | Warpage large, being more than 50μ | X |
| 1-2 | Urethane acrylate + Acrylate monomer | — | Good | Less than 100μ | ⊙ |
| 1-3 | Acrylate monomer | — | Spotless, cohesion to aluminum poor | Warpage large when trifunctional monomers were used | X |
| 1-4 | — | (Mitsubishi Rayon) UL3026 | Fair Polycarbonate substrate whitened, its cohesion to aluminum poor | Good | Δ |
| 1-5 | — | MR-8331B (Matsushita) | Good | Good | ⊙ |
| 1-6 | — | Silicone thermosetting hard coat (Toshiba Silicone) | Fair Cohesion to aluminum poor | Warpage large | X |

TABLE 2

| Experiment No. | Urethane acrylate A UA-160P (Mitsubishi Yuka) | Urenthane acrylate B UL-5003 (Mitsubishi Rayon) | TMPTA + MANDA | G | Evaluation |
|---|---|---|---|---|---|
| 2-1 | 30 Parts by weight | 10 Parts by weight | 60 Parts by weight | 30 Parts by weight | ⊙ |
| 2-2 | 60 | — | 40 | — | X |
| 2-3 | — | 50 | 50 | — | Δ |
| 2-4 | 10 | — | 80 | 10 | ◯ |
| 2-5 | 5 | 5 | 80 | 10 | ◯ |

TABLE 3

| Experiment No. | Film thickness (μm) Protective film | Hard coating | °Coating performance °Warpage | Surface hardness (pencil lead) hardness) |
|---|---|---|---|---|
| 3-1 | 0.8 μm | 5 μm | Spotty when the protective film was applied | 7H |
| 3-2 | 2.0 μm | 5 μm | Good | 7H |
| 3-3 | 30 μm | 5 μm | Good | 7H |
| 3-4 | 50 μm | 5 μm | Warpage large, the protective film had undulations | 7H |
| 3-5 | 10 μm | 0.6 μm | Hard coating spotty and striations on internal circumferential edge | 3~4H |
| 3-6 | 10 μm | 1 μm | Good | 5H |
| 3-7 | 10 μm | 20 μm | Good, somewhat spotty on the outermost circumference | Higher than 7H |
| 3-8 | 10 μm | 40 μm | Warpage large, cracking on the outermost circumference | Higher than 9H |

As described in the foregoing, this embodiment provides an optical disc comprising a resin disc and a metal film formed on said undulations, in which a protective film is formed on said metal film, and a hard coating on the outermost surfaces of the part having said undulations. It is an optical disc in which the protective film on the aforementioned metal film is an ultraviolet setting type coating consisting of a set film of a mixture of at least one or more types of urethane acrylate, at least one or more types of acrylate monomer and a sensitizer. Further, it is an optical disc in which the aforementioned hard coating is a set film of an ultraviolet setting type coating material with its bridging density higher than that of a protective film and having 50 weight % or more of molecules having 3 or more (meth)acrylyl functional groups. The thickness of the aforementioned protective film needs to be from 2 μm to 30 μm for reduction of warpage; more preferably, it should be an optical disc having a film thickness of the aforementioned hard coating from 1 μm to 20 μm. The protective film, if formed singly with urethane acrylate, will be soft and vulnerable. For this reason, its mixed composition with at least one or more types of (meth)acrylate monomer needs to be employed. Further, at least one or more types of (meth)acrylate, if singly used, show low cohesion to the metal film. Further still, by utilizing an ultraviolet setting type coating in conjunction with a sensitizer, the setting can be preformed in a short time, thereby averting temperature rise of the resin substrate. As the hard coating of this invention, thermosetting type materials such as silicone or melamine, which will induce temperature rise and warpage, should preferably be shunned; they should preferably be hard coating set film of ultraviolet setting type coating compositions containing 70 weight % or more of molecules having 3 or more (meth)acrylyl radicals. The appropriate thickness of the protective film, being applied on one surface only, should be 2 μm to 30 μm; if it is less than 2 μm, moisture resistance can not be assured, but if more than 30 μm, not only the disc warps, but the flatness of the hard coating can hardly be attained. The film thickness of the hard coating is optimal from 1 μm to 20 μm; if it is less than 1 μm, the softness of the resin substrate exerts adverse effects, detracting from attaining desired surface hardness. If it is more than 20 μm, however, not only the substrate warps, but coating spots are likely to develop. The hard coating on the protective coating may be omitted and it is practicable to print any coatings or add any dyes.

INDUSTRIAL APPLICABILITY

As hereabove described, according to the present invention, a 2~30 μm protective film is formed on the surface of a metal film of an optical disc comprising a resin disc and a metal film formed on the disc, with high cohesion to metal and protection of the metal from corrosion, and a 1 μm~20 μm hard coating is formed on at least one of the front or the back surface, thereby not only forestalling vulnerability of the disc, but providing a disc which is less susceptible to warpage and is easy to handle; in these respects, this invention is effective.

The scheme of this invention is applicable to optical discs of varied types.

What is claimed is:
1. An optical disc which comprises:
   a. a light permeable resin disc,
   b. a metal film formed on at least one surface of said resin disc,
   c. a protective film formed on said metal film, said protective film being made of a set film of an ultraviolet setting type composition having excellent adhesion to said metal film, and
   d. a hard coating film formed on said protective film and on the opposite surface of the resin disc, said hard coating film being made of a set film of an ultraviolet setting type composition higher in crosslinking density than said protective film and excellent in light permeability.
2. The optical disc according to claim 1 wherein the protective film is a set film of an ultraviolet setting type composition which consists of a set film of a mixture of 1~30 weight % of urethane polyacrylate having in its molecule 0.1~10 weight % of at least one or more phosphate radicals, at least one or more types of acrylate monomer, and a sensitizer, and wherein the hard coating film is a set film of an ultraviolet setting type coating composition having 50 weight % or more of molecules with 3 or more (meth)acrylyl functional groups and containing 1~30 weight % of epoxyacrylate, a sensitizer, and an acryl monomer diluent.

3. The optical disc according to claim 1 wherein the thickness of the protective film is from 2 μm to 30 μm and wherein the film thickness of the hard coating is from 1 μm to 20 μm.

* * * * *